Figure 1:
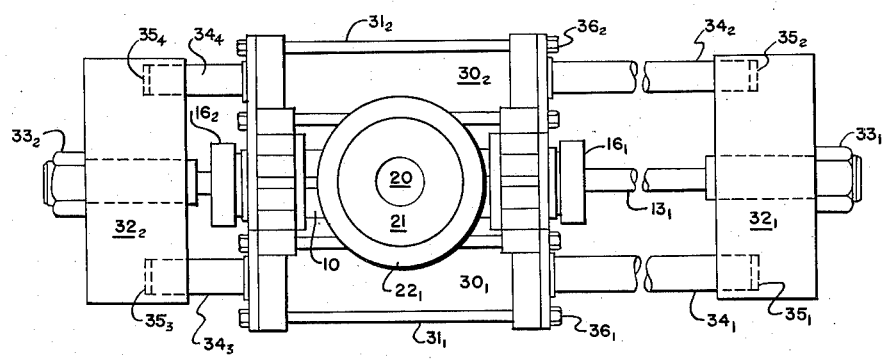

Feb. 14, 1961 H. A. THOMAS 2,971,456
RECOVERY APPARATUS AND METHOD
Filed April 30, 1959 2 Sheets-Sheet 1

United States Patent Office 2,971,456
Patented Feb. 14, 1961

2,971,456

RECOVERY APPARATUS AND METHOD

Henry A. Thomas, Baton Rouge, La., assignor to Ethyl Corporation, New York, N.Y., a corporation of Delaware Filed Apr. 30, 1959, Ser. No. 810,059

5 Claims. (Cl. 100—37)

This invention relates to the treatment of metal containing sludges containing a high proportion of solids plus at least one liquid component. More particularly the invention relates to apparatus and an improved method for the resolution of such sludges, particularly malleable metal containing sludges, into highly compacted and substantially homogeneous solid masses, accompanied by the segregation of the liquid phase as a recoverable liquid material.

Many chemical and industrial processes involve the handling or disposition of solid-liquid systems or sludges wherein both of the solid and liquid components are highly valuable or desirable materials. This is particularly true in certain chemical operations wherein a sludge includes a metal component and a liquid component which can include a valuable product of a process involved. Illustratively, in the manufacture of organo metallic compounds, of which tetraethyllead is an outstanding example, a by-product or residual sludge is generated which, for example, includes a high proportion of sub-divided lead particles, and a liquid phase which can include variable amounts of tetraethyllead liquid, and/or an aqueous phase. The relative proportions and concentrations of the several components can of course vary.

In all embodiments of manufacturing processes, material conservation is quite vital. Hence, in the case of such sludges, it is essential to recover as great an amount of the metal component, such as lead, as possible, as well as the liquid tetraethyllead present. Recovery operations in the past have included the thermal drying of such sludges leaving a dry, powdered mass of finely divided lead solids accompanied by small amounts of sodium chloride. This solids material was then smelted in reverberatory furnaces, an expensive and difficult operation. For various reasons, not fully understood, it has been essential to employ smelting conditions, i.e., furnace temperatures, drastically above the true melting point of the metal, this peculiarity apparently being a result of the high degree of subdivision of the metal solids.

It has been found that sludges of this character—i.e., containing a malleable or readily deformable metal solids component and a liquid phase of at least one liquid component, can be processed to convert the lead or malleable metal into a substantially homogeneous, compacted shape and at the same time the liquid phases can be isolated as readily removable and substantially solid-free materials. Generally, in order to implement such an operation, a charge of the sludge is introduced into a chamber wherein a moving ram or piston is provided, the chamber being closed or partly closed at an end remote from the piston opening by a die-type closure, having a die aperture of appreciably smaller transverse area than the chamber proper. Application of relatively high pressure by movement of the piston on the charge in the direction of the die, has been found to result in a mechanical working of the lead solids to the extent that they are cold worked together to form a substantially homogeneous mass, and concurrently the liquid phase is segregated, being removed in part by movement out of the die adjacent to the worked solid portion, and by other means. This process has been found to be highly effective, but numerous difficulties have been encountered in implementing the process in commercial installations because of problems associated with the mechanical design of the equipment. Among such problems is the extreme difficulty of maintaining a seal for the actuating element or piston rod, or ram, which supplies the actuating movement of the piston element within the chamber. An additional difficulty in carrying out the process by reciprocating ram type machines has been that when the force necessary for the extrusion-recovery operation has been applied by a ram, it is found that deflection and bending of the ram (or piston rod) has been frequently encountered. This is because the rod or ram is under compression, and an extremely high degree of rigidity is required to prevent deflection owing to the cantilever situation of the ram or owing to erratic forces occurring at the end of the ram in its movement. Another difficulty has been that the efficiency of operation of ram type apparatus has been limited owing to a peculiar nature or phenomenon in applying pressure on the raw sludges being processed. This phenomenon is the differentiation of the results into an initial period during which apparently the particles are merely compacted—that is, are merely pushed closer together without appreciable deformation of individual particles—followed by a deformation-extrusion period wherein the solids are forced out of the die aperture as a substantially homogeneous billet. The forces applied in the first stage are relatively moderate compared to the forces applied in the final stage. However, the powering mechanism must be sturdy enough, of course, to apply the final ultimate pressure required. This phenomenon has been responsible for relatively inefficient use of the available powering means applied to a reciprocating ram type operation. Another difficulty associated with the prior operations has been that when forcing a substantially homogeneous billet through a die, and then retracting a ram, there has been a tendency for lead sheets to form between the boundary of the ram or piston and the wall of the chamber, and for said lead sheet to be removed or forced backward toward the seal and to damage the seal means provided. A further particular difficulty has been the difficulty in feeding the apparatus, that is, in introducing raw sludge to the processing chamber for the above described compacting-extrusion operation. From the foregoing it is apparent that the application of the discovery that lead-liquids high solid sludges could be resolved into homogeneous solid bar products and recoverable liquid phases, while a highly effective and operable process, introduced a substantial number of serious apparatus and ancillary process problems.

A general object of the present invention is to provide a new and improved apparatus and method for highly efficient processing of high solid sludges of finely subdivided malleable or readily deformable metals and at least one liquid phase. A more particular object is to provide apparatus which avoids difficulty, heretofore encountered, occasioned by deflection or minor bending of reciprocating parts of apparatus heretofore known. A more particular object is to provide apparatus exhibiting a dual function in each reciprocating cycle, viz., a feeding and preconditioning operation accompanying each working stroke of the reciprocating elements. An additional object of the apparatus is to provide equipment which avoids difficulties occasioned by damage to sealing means for the ram or piston rod and its extension through the walls of a processing chamber. An additional particular object is to provide an apparatus including associated motor means, for the processing of sludges of the type indicated, said apparatus being highly compact and susceptible to extremely convenient maintenance or replacement of work parts or interchange for different purposes. An additional object is to provide apparatus, including motoring means, which is particularly susceptible to multiple installations, viz., suitable for engagement as individual units to a battery or plurality of preceding process units wherein ready removal and replacement by standby units is facilitated. An additional object of certain preferred embodiments of the apparatus of the invention is to provide a device or machine which functions not only to process the high solids sludges, but, as required, serves as a closure for an adjacent unit of process equipment. In yet another embodiment, an object is to provide a method wherein the compaction and formation of solid billets of the metals, plus the segregation of the liquid phase, is joined in and combined with a preceding feed and storage operation for said sludge in such a manner as to provide a highly effective and additional benefit to the separation-solids processing operations. Other objects will appear hereinafter.

In its most general form, the apparatus of the invention includes an elongated processing chamber of uniform cross sectional configuration, having a reciprocable element or piston therein, said piston relatively snugly fitting the transverse area of the chamber. The chamber is also provided with a feed port located in the wall generally at the mid-point thereof. Piston rods or motivating rods are attached to the piston element at both sides and extend through the ends of the chamber, each rod being sufficiently long to engage or be engaged by motor means externally of the chamber. Associated with the ends of the elongated chamber and actually forming part of said chamber boundary, are die means positioned at substantially right angles to the axis of the chamber and securely attached thereto. The die means have at least one aperture therein, which, in the preferred forms of the invention provides the dual function of permitting movement of the piston rods heretofore cited and for providing outlets for the substantially homogeneous lead solid shapes formed by the process. The method of the invention involves reciprocating, in an elongated processing chamber, a relatively snugly fitting transverse element such as a piston, and providing a supply of raw sludge at a feed port at the mid-section of the chamber. A charge of sludge in the chamber is forced to an end thereof, and the solids are forced through an aperture under sufficient pressure such that the metal is cold worked and formed into a substantially homogeneous bar-like shape. Concurrently the liquid, in part, is also forced through the aperture, another portion of liquid phase or phases being forced counter to the movement of the transverse element in the chamber and back toward the feed port. After terminating the transverse element travel toward an aperture, a reverse pass is initiated under such conditions that a partial vacuum is established which is operative on the sludge supply when the transverse or piston element passes the said feed port. The sludge is thus aspirated into the chamber in back of the piston and serves as the charge for the succeeding cycle. Accordingly, at the same time, one incremental charge is being induced and preconditioned in the chamber while a previous charge is being processed and the metals thereof discharged from the zone. During the reciprocation of the transverse element, the chamber portions are effectively sealed from the exterior by a residual quantity of treated lead solids retained in the apparatus at the ends of the elongated zone as a solid plug.

Figure 2:
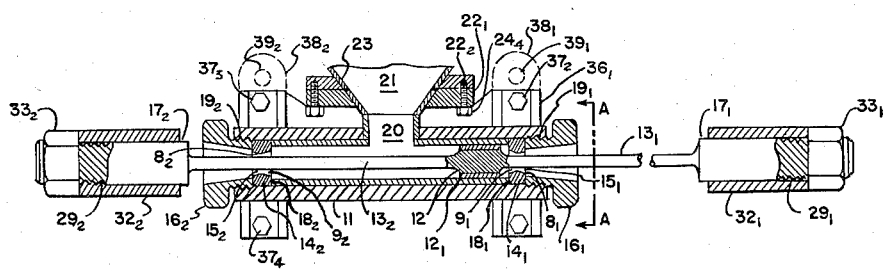
Figure 3:
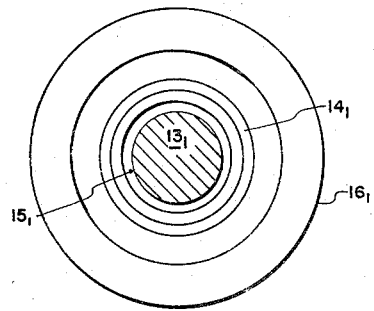
Figure 4:
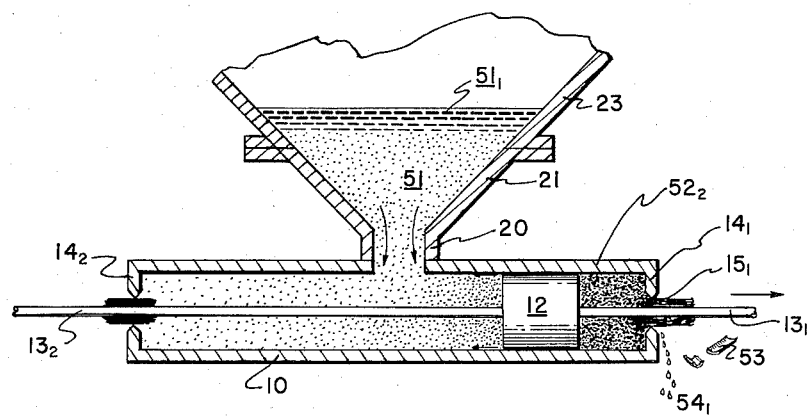
Figure 5:
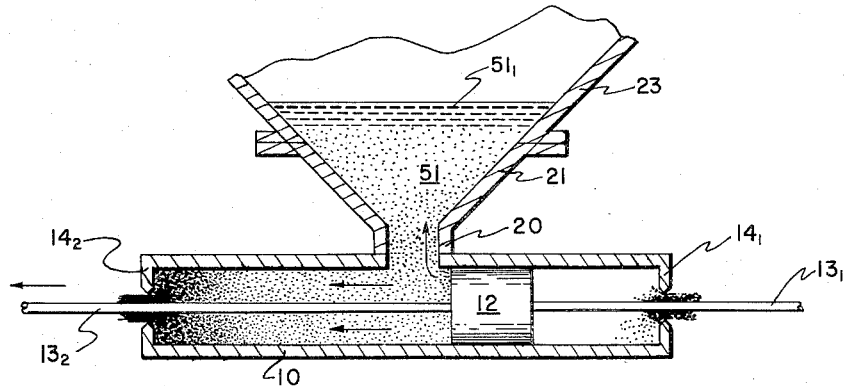

The details of the apparatus and method of the several embodiments of the invention will be more fully understood from the detailed description hereafter and from the figures wherein Fig. 1 is a general plan view of a preferred and particular embodiment of the invention, Fig. 2 is an elevational view of a particular and preferred embodiment, and Fig. 3 is a view of the die element employed in the embodiment shown in Figs. 1 and 2, illustrating the details of an interrelation of the die with certain other portions of the apparatus, Fig. 4 is a schematic representation showing the position of typical apparatus elements and the condition of the materials during a working stroke when the pressure is being applied on a sludge charge, and Fig. 5 is a similar schematic representation showing material flows and disposition of apparatus elements when the transverse element or piston is moving toward the feed port.

Referring to Fig. 1, it is seen that the apparatus includes a central processing section including a barrel 11, and two comparable length and parallel motor units $31_1$, $31_2$. Extending from each end of the processing unit 11 is a piston rod, extending through both ends thereof, the ends $13_1$, $13_2$ extending to different lengths because of the current position of the piston in the barrel 11. Similarly, projecting from both ends of the hydraulic motor units $31_1$, $31_2$ are the ends of piston rods $34_1$, $34_2$, $34_3$, $34_4$ therein. The ends of said piston rods most remote from the motor unit are received in sockets $35_1$, $35_2$, $35_3$, $35_4$ in the cross arms $32_1$, $32_2$. A very minor clearance is provided, frequently, so that the actuating force applied to the piston rod 13 is substantially only tensile stress. The ends of the processing unit piston $13_1$, $13_2$ are secured by nuts $33_1$, $33_2$. As explained hereinafter, the movement of the piston and piston rod of the process unit is accomplished by tension on the piston rod exerted by the cross arms $32_1$, $32_2$ as explained hereinafter.

Surmounting the processing unit 11 is a conical feed section 21. The conical feed section joins a cylindrical port 20 in the wall of the processing unit cylinder 10. The feed port 20 can be, as shown in this embodiment, a quite short cylindrical extension from the circular hole in the processing unit cylinder 10. Normally, the feed section 21 is terminated in a flange $22_1$ for engaging supplemental or precursory apparatus as hereafter described.

In this embodiment a positive and secure alignment of the two hydraulic motor units $31_1$, $31_2$ with the processing unit 11 is essential, and this is provided by a cross support structure or structure members $36_1$, $36_2$ and by cross tie rods or tie bolts $37_1$, $37_2$, $37_3$, $37_4$ which rigidly maintain the desired parallel assembly of these three generally cylindrical portions of the apparatus. Included as a portion of the cross bracket or support structure are extension lugs $38_1$, $38_2$, provided with holes $39_1$, $39_2$ for readily and easily lifting and moving the apparatus as required.

The interrelationships of the working portions of the apparatus are further more clearly illustrated by Fig. 2, which is an elevation of a section AA of the embodiment of the apparatus shown in plan in Fig. 1, and showing the operative mechanism of the processing unit 11.

Referring to Fig. 2, the processing unit 11 includes, as heretofore mentioned, a cylindrical barrel 10 having a feed port segment 20 at a central position on the upper wall thereof. A piston 12 is provided snugly fitting the chamber and capable of reciprocation back and forth in the chamber. In this embodiment the piston 12 is formed by an enlargement on a shaft, and by a screwed or threaded collar or collar element $12_1$ fastened thereto. Thus, the piston body is a portion of a solid bar having two extensions or extension rods $13_1$, $13_2$, extending beyond the limits of the barrel 10 in all positions, and terminating in threaded portions $13_3$, $13_4$. The threaded portions $13_3$, $13_4$ pass through holes $29_1$, $29_2$ in the respective cross arms, for engagement by the retaining nuts $33_1$, $33_2$. Hence, by movement of the cross arms $32_1$, $32_2$, under the influence of the hydraulic motor units $31_1$, $31_2$, the piston 12 is moved toward an extremity of the processing unit 11 by tension applied to one of the piston extension rods $13_1$, $13_2$. The enlarged and threaded ends $17_1$, $17_2$ of the piston rod extension $13_1$, $13_2$ are sized to snugly fit holes $29_1$, $29_2$ in the respective cross arms $32_1$, $32_2$ to assure a positive and precise alignment.

It is seen that the barrel 10 of the processing unit, plus the piston slidable therein provides a chamber divided into two portions of annular configuration, and variable length, dependent upon the position of the piston 12. The extremities of the chamber are bounded in part by die plates $14_1$, $14_2$. These are cylindrical plates adapted to engage a shoulder $18_1$, $18_2$ formed in the barrel 10. The die plates $14_1$, $14_2$ are rigidly pushed and fastened against the shoulders $18_1$, $18_2$ by means of a corresponding threaded collar $16_1$, $16_2$, which engage a threaded portion $19_1$, $19_2$ in the ends of the barrel 10. The collars $16_1$, $16_2$ have a conical, outwardly diverging opening therein, at all points of substantially greater diameter than the diameter of the piston rod extensions $13_1$, $13_2$.

The dies $14_1$, $14_2$ of the present embodiment are a particularly effective feature of the apparatus and represent a significant portion of the most preferred embodiments. The die plate is preferably of hard steel or tool steel material and includes an aperture $15_1$, $15_2$ which at all points is of somewhat greater diameter than the corresponding rod extension $13_1$, $13_2$. The aperture $15_1$, $15_2$ includes a converging entry portion $9_1$, $9_2$, and a diverging exit portion $8_1$, $8_2$. The normal angle of convergence is a total included conical angle of about 60 to 120° and a suitable range of angles of divergence or exit are from about 5 to 30°, although the particular angles involved are not highly critical.

The relative disposition of the feed section is clearly shown. The feed section, 21, as heretofore mentioned has attached to it a flange $22_1$. A hopper 23 is positioned above the apparatus, and includes a flange $22_2$ corresponding to and meeting with the flange $22_1$ of the feed section. Flange bolts $24_1$, $24_2$, spaced according to a normal flange pattern, provide a ready means for attaching the apparatus to the hopper 23.

Another view of an important portion of the apparatus is a view of a typical die plate $14_1$ in place as given by Fig. 3. Referring to Fig. 3, this is an enlarged view of a section BB of the processing unit showing a typical die in place. Referring to Fig. 3, the figure shows an annular space $15_1$ established by the opening of the die plate $14_1$ and the cross section of the piston rod extension $13_1$. The relative proportions of the collar $16_1$ and the conical opening therein are shown.

From the foregoing description, it will be readily seen that the apparatus as described above provides for reciprocation of the piston from one extremity of the barrel 10, adjacent the die plate near the exterior thereof, to the other extremity at the opposite of the barrel 10 and adjacent the opposite die plate. This movement is accomplished by thrusts of the piston rods of the double acting hydraulic motors $31_1$, $31_2$ and result in movement of the piston 12 by tensile forces. Thus, it is seen that the piston in its travels reciprocates back and forth between positions adjacent the respective die plates $14_1$, $14_2$, and passes the entry or feed port 20 during a typical or any individual stroke. Further, it will be noted that the length of the piston, or piston liner $12_1$ in this embodiment can be sufficient to span the opening of the feed port 20. The significance of these relative proportions will be explained hereinafter.

The merits and significant features of the operation of the various embodiments of the present apparatus are illustrated by reference to Figs. 4 and 5, these figures being schematic cross sectional views of typical embodiments processing a charge or a feed of a sludge consisting of lead particles, and a liquid phase including predominantly a dilute sodium chloride solution in water plus a minor quantity of an organometallic liquid phase such as tetraethyllead. The figures show the disposition of the material being processed and different portions of the cycle, "cycle" herein referring to a cycle of reciprocating operation of the piston and embodiment of the apparatus.

Referring to Fig. 4 and to Fig. 5, both of these figures show the principal elements of the processing units, including a feed section 21, merging to a feed port 20 which opens into the space enclosed by the barrel 10 of the processing unit. Enclosed in the barrel is the reciprocable piston 12, having piston rod extensions $13_1$, $13_2$ attached thereto. The ends of the barrel are terminated or partially closed by die plates $14_1$, $14_2$.

Referring specifically to Fig. 4, the charge 51 to the process is introduced into the feed section 21, or more properly into the hopper 23. Because of the relatively high density of the predominantly lead solids, there is a strong tendency for the lead particles to descend and accumulate at the bottom, adjacent the feed port 20, and for a small amount of liquid or sludge of relatively high liquid concentration to form as a surmounting layer $51_1$.

In this portion of the cycle the piston 12 is being moved toward one end, toward the die plate $14_1$ by tension applied by the piston rod $13_1$. Under the influence of this movement, a previously introduced mass of sludge $52_2$ is forced toward the aperture $15_1$ of the die plate $14_1$. This movement results in two principal phenomena, viz., the removal of the liquid phase by, primarily, the action of pushing the solid particles closer together without appreciable deformation. Accompanying this movement is a backward flow of liquid phase, so separated, past the piston 12 by movement through the minor clearance provided between the piston and walls of the barrel 10. Hence, a major portion of the liquid passes past the piston 12 in the reverse direction of movement. The second phase of operation or events in movement of the piston 12 toward the die $14_1$ is the application of high pressure upon the individual lead sludge solids, particularly as they approach and are forced through the aperture $15_1$ of the die $14_1$. It is found that this phase of operation is accompanied or results in a significant and high degree of mechanical deformation, particularly as the lead solids enter and pass through the aperture. Owing to the existence of the piston rod $13_1$ occupying a major portion of the aperture or die $15_1$, it will be seen that the solid, substantially homogeneous, metal shape thereby formed is in the shape of an annular segment. The segment flows through the aperture around the piston rod $13_1$, and at a variable point beyond the confines of the die plate $14_1$ is normally disengaged, or frequently is disengaged by supplemental means not shown. Accompanying the discharge of the thus formed homogeneous, solid lead shapes 53 is the movement and discharge of relatively minor quantities of liquid $54_1$, which rapidly drains away from the die plate and the solid billet or annular shape surrounding the piston rod $13_1$.

During the movement of the piston 12, in this portion of a cycle, toward the die $14_1$ it will also be seen that a supplemental effect is provided with respect to the feed still remaining or available in the feed section 21. Owing to the movement of the piston away from the feed port 20, a suction action is applied on the feed material 51, with the result that an additional portion is introduced to the barrel 10 interior and tends to follow the movement of the piston 12 in its travel. This movement is indicated by arrows as shown. Thus, in the final position of the piston at the end of the working stroke toward the die plate $14_1$ the space in back of the piston 12 and the feed port is at least partially filled with raw sludge.

The cycle or movement of the piston is now reversed, and by tension applied on the piston rod $13_2$ the piston 12 is forced back toward the feed port 20. In this movement, it is readily seen that, until the piston passes the feed port 20, there is no significant pressure in resistance to its movement as will be encountered at the time the piston is approaching the die plate 14₂ at the opposite end of the barrel 10. In other words, the major resistance to movement of the piston in this initial portion of a full cycle of travel is the static head applied by the charge of sludge within the feed section 21 and hopper 23. Accordingly, during this initial portion of travel, it is found, surprisingly, that a partial segregation of liquid and solids is achieved owing in part to the extremely high difference in specific density of the lead solids and the accompanying liquid phase. The partial separation is manifested by a reverse flow of material out of the feed port 20, and by the fact that this material will be substantially predominantly liquid phase. Concurrently, the solids portion of the charge within the chamber are pushed toward the die plate toward which the piston is traveling, so that at least a substantial portion of the initial phase of operation—viz., the separation of a liquid phase without significant deformation of solids—is accomplished prior to the actual utilization of the resistance to movement of the die plate proper. A further highly significant benefit is achieved owing to this phenomenon, in that upward flow of liquid into the feed port is responsible for a degree of agitation of the sludge therein which is particularly helpful for feeding an additional segment, as already described, when the piston 12 is passed and is traveling from the feed port.

During the travel of the piston from the die plate toward the opposite die port (and of course during a portion of such movement, toward the feed port 20), the residual or remaining portion of the lead or metal solids from the preceding stroke is retained within the aperture 15₁. As previously mentioned, at this point in a processing cycle, the lead solids have been formed by the high pressure applied thereto, into a substantially homogenous metal shape. This "plug" substantially seals the opening against movement of atmosphere into the chamber during this portion of travel of the piston. Hence, a certain degree of vacuum is established within the chamber at this portion, and at the time the piston passes the feed port 20, this vacuum is extremely beneficial in inducing a sudden and significant movement of sludge charged 51 through the feed port 20 into the barrel.

The condition of the system of materials being processed is illustrated by Fig. 5, showing the disposition of materials as the piston 12 is traveling in a reverse direction to the working stroke described above and illustrated in Fig. 4. In movement toward the feed port 20, there is dual tendency for flow of the sludge components, some of the material being directed in a lateral direction, and some being thrust upwardly in the feed port. The precise differentiation of compositions of these pseudostreams is not ascertainable, but it appears that the upwardly flowing components are predominantly liquid phases. The differentiation is believed to occur as a result of the substantial difference in densities of the solid and liquid components.

It will be clear from the foregoing description of the particular embodiment and of the operation thereof that a great degree of variation on the several elements of the apparatus are possible without departing from the spirit of the invention as is discussed more fully below.

The amplitude of stroke of the piston and the motor elements of the apparatus is not highly critical, but is relatively important. The degree of movement, relative to the cross section of the process unit thereof, is not as important as in ram type operations, owing to the fact that the force applied to the piston is by means of tensile forces on the piston rods attached to both faces thereof. In contrast, in ram type machines, when a long, relatively narrow ram is employed, the forces are solely compressive during a working stroke, and if a relatively high slenderness ratio exists, a certain undesirable degree of deflection of the ram element is frequently encountered. This can even result in a certain degree of scoring or undue wear of the wall of the barrel of the process unit. In illustrative embodiments of the apparatus, the stroke can be satisfactorily varied from a total of one foot up to about four feet without particular harm. However, because of the necessity of utilizing each working stroke in a dual fashion—that is, accompanying the working stroke is an inducing or feeding stroke, owing to the induced flow of charge as the piston moves away from the feed port, a long stroke is generally undesirable, except in the case when solids of the sludge are relatively low in proportion and particularly where there is not as high a degree of difference of densities of the solids and liquid phases.

One factor of considerable significance, for apparatus intended for any particular sludge system, is the "operating or working ratio." By this is meant the cross sectional ratio of the aperture for discharge of the solids, relative to the cross sectional area of the annular space formed within the process chamber and the piston rod extensions projecting from the piston. This variable is customarily expressed as a reciprocal, that is in terms of the chamber area:discharge area. As indicated the preferred range involved is dependent to some extent upon the particular characteristics of the sludge and of the metal particles thereof. In the case of sludges such as are produced in the manufacture of organometallics of lead, for example and particularly, tetraethyllead, suitable ratios are from 2:1 to 60:1. In other instances, appreciably higher or smaller ratios can be employed. It is seen that this expression is an indication of the degree of area reduction accomplished in the processing operation, and that higher ratios are comparable to a higher degree of area reduction. The practical implication of this factor, for a uniform composition and type of feed material, is that with higher ratios, higher unit pressures are frequently required to achieve discharge, and frequently it is unnecessary to go above a certain level to obtain perfectly satisfactory results insofar as separation of the solids-liquid phases and forming the solids into a homogeneous type shape is concerned.

An additional factor of significant implication in the operation of apparatus corresponding to the present invention is what is termed herein relative speed ratio. The ratio of the linear velocities of such shapes to the linear velocity of the piston is only, usually, slightly below the working ratio of the apparatus. Thus, for example, if a working ratio of approximately 12:1 is provided, the ratio of linear velocities will be of the order of 10 to 11:1. This difference in velocities assures that the solid shape does not adhere to the piston rod and is easily separated therefrom. In another embodiment of the apparatus, a relative speed ratio is about 9:1, or, for example, about 9 feet per second linear velocity of the metal shape relative to a 1 foot per second velocity of the piston rod.

The particular configuration of the aperture of the die plate, or the die proper, is an important element of the apparatus. As clear from the preceding description, in the preferred embodiments of the apparatus it will be seen that the die forms an annular space surrounding the piston rod providing movement of the piston, another process unit. This is a highly effective embodiment, and in the most effective design, as explained, the die in lateral cross-section includes a conical entry portion and a conical discharge portion. The particular benefits of this feature are that metal is forced through this space during a working stroke and upon passing the point of least diameter, and arriving at a position at which no forces are being applied, the metal tends to expand slightly, thus filling in to some degree the conical divergence portion of the die. The degree of expansion at this point will, of course, depend to a great extent upon the physical characteristics of the metal itself, but even in the case of an extremely malleable metal such as lead, expansion occurs to a desirable extent. The phenomenon is desirable in that it is found that when the piston completes the working stroke and starts retraction or movement away from the die, the "locking in" effect at this point assures that the metal will not be withdrawn by the movement of the piston rod into the chamber proper.

An additional form of die configuration involves separate apertures separate from the piston rod proper, i.e. holes in the die plate which do not abut the port through which the piston rod slides. It is clear that various forms of such a design can be employed, but generally these are considered less desirable.

Still another variety of die design involves a scalloped configuration wherein semi-circular openings about the piston rod as such, so that ribs or segments of the die material actually engage the piston rod. The product may be shaped to suit subsequent process requirements—as to shape or dimensions.

In virtually all practical forms of the apparatus, it is preferred to employ a chamber of cylindrical cross section, but this particular feature is not absolutely essential. In certain instances, oval designs or even rectangular cross sections can be employed. This variation is limited in application, however, because the unit stresses on the material of construction tend to increase greatly in those cases wherein a non-cylindrical design is employed.

As heretofore indicated, in numerous and preferred embodiments of the apparatus, the length of the piston, that is, its dimension along the axis of the processing chamber, is sufficient to more than cover the entry port. The practical significance of this operation is that in cases when a temporary interruption of operations is required, the piston can be positioned at a dead center spot and thus will operate as a tight closure to the feed section or hopper.

Still another feature in highly preferred embodiments involves a non-uniform cross section of the piston rod in the portion thereof which reciprocates through the die plate. In a preferred embodiment a very minor taper is applied in an outward direction. In other words, in a typical embodiment, the diameter of the piston rod adjacent the piston may be several thousandths of an inch greater than the diameter at its outer-most extremity. This assures that upon retraction of the piston or movement away from a die after completion of the working stroke, that the piston rod tends to free itself from any gripping action by the metal retained in the die aperture. Only a minor taper is necessary in such instances. The residual or remaining portion of the lead or metal solids from the preceding stroke is retained within the aperture $15_1$.

The degree of depth of charge in the feed hopper and in the feed section is not highly critical, but in all cases, during steady state operation, sufficient material should be provided so that the feed port to the processing chamber is continuously blanketed. Thus, customarily a depth of from 1 to 4 feet of sludge above the feed port is quite desirable.

As previously indicated, in many operations, the solid material discharged from the process unit is in the shape of an annular form surrounding the piston rod. In certain instances this material is friable enough to crack off owing to the movement of the piston rod and normal vibration of the apparatus. In other cases, it is frequently desirable to provide a cutter means forming part of the apparatus and comprising a knife or blade bearing on the piston rod and disengaging the solids therefrom.

In most of the desired embodiments of the apparatus, hydraulic motors are preferred for actuating the process unit portions. By hydraulic motors is meant cylinder piston units, usually of the double acting type, and having piston rod extensions projecting from both ends of the hydraulic cylinder so that dependent upon the direction of movement the desired tensile forces can be applied to the piston rod causing movement of the piston of the process unit. However, the invention is not limited to this particular variety of motor and in certain cases rotating screw arrangements, provided to actuate the cross heads of the apparatus, will be quite satisfactory. Alternatively, the piston rod actuating the piston of the process unit can be lengthened and provided with square type threads for engaging a power actuated nut drive. This is a satisfactory technique but in general suffers from the deficiency that the speed is lower than is readily attainable with hydraulic motors.

To further illustrate the actual operaton of a device of the character described in the above, the following is an illustrative example. In this embodiment the processing chamber of the unit is about 3 inches in diameter and approximately 16 inches long inside. The piston employed is 3 inches in diameter minus 7 thousandths of an inch for side-wall clearance and is approximately 5 inches long to be capable of covering a feed port, at the center of the chamber, of 4 inches in diameter. It will be seen that the stroke of this apparatus is in the neighborhood of 19 inches total, including, in any full one-way cycle, about 5 inches of actual working strokes and 9 inches of initial stroke prior to passing the feed port. The piston rods are 2 inches in diameter and an annular type die is employed having a minimum open diameter of 2⅛ inches. In processing a typical charge, a sludge composition of the following is provided: The speed of operation of the apparatus is approximately 7 complete cycles (a complete forward and back stroke) per minute. The solids of the charge are discharged as annular or part annular portions of substantially homogeneous character and virtually denuded of liquid phase. By this is meant that the liquid phase is reduced to a total of about 1.5 weight percent. The working ratio in this embodiment is approximately 10:1. With the proportions indicated, the relative speed or speed ratio of the sludge, upon being forced through the die aperture to the linear movement of the piston rod, is approximately 9:1.

Having fully described the apparatus and process of the invention, what is claimed is:

1. Apparatus for treating a sludge of subdivided malleable metal solids in at least one liquid component and for forming the solids thereof into substantially liquid-free, bar-like shapes, comprising an elongated chamber of uniform cross section, reciprocatable piston means therein and piston rods attached to said piston means and extending through apertures in both ends of said chamber, a feed port at the approximate mid-point of said chamber for receiving fresh sludge, and die means in each end of said chamber defining openings of smaller cross sectional area than in the transverse area of said chamber, and motor means for reciprocating said piston means by operative engagement in tension with the piston rod.

2. The apparatus of claim 1 further defined in that the openings in each end of said chamber for the piston rods are larger in diameter than said rods, and the die opening is defined by the annular space between said piston rods and the openings therefor.

3. The apparatus of claim 1 further defined in that the piston means is of sufficient length to close the feed port to the elongated chamber.

4. A method of separating malleable metal solids from a high solid sludge containing subdivided malleable metal particles and at least one liquid component comprising maintaining a supply of fresh sludge adjacent a port at approximately the lateral mid-point of an elongated processing chamber, inducing flow of a sludge charge into said chamber in both directions from said feed opening by a partial vacuum established principally in one branch of said chamber and by gravity flow, then forcing movement of said sludge charge so formed toward the end of said zone wherein the partial vacuum was established, said movement being accompanied by sufficient pressure in the said branch of the elongated chamber to cause flow of the solids through a discharge orifice of substantially smaller cross sectional area than the said elongated zone, and said discharge solids being in the form of substantially homogeneous, liquid-free, solid shapes.

5. The process of claim 4 further defined in that the high solid sludge comprises subdivided lead, a dilute sodium chloride solution in water and minor amounts of a tetraalkyllead.

References Cited in the file of this patent

UNITED STATES PATENTS

| | | |
|---|---|---|
| 2,697,979 | MacMurray | Dec. 28, 1954 |
| 2,752,847 | Vandenburg | July 3, 1956 |